United States Patent
Schmisseur et al.

(10) Patent No.: US 7,290,127 B2
(45) Date of Patent: Oct. 30, 2007

(54) SYSTEM AND METHOD OF REMOTELY INITIALIZING A LOCAL PROCESSOR

(75) Inventors: Mark A Schmisseur, Phoenix, AZ (US); Timothy J Jehl, Higley, AZ (US); Richard P Mackey, Phoenix, AZ (US); Delf Atallah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 10/032,762

(22) Filed: Dec. 26, 2001

(65) Prior Publication Data

US 2003/0120910 A1  Jun. 26, 2003

(51) Int. Cl.
*G06F 15/177* (2006.01)

(52) U.S. Cl. .......... 713/2; 709/204; 710/311; 710/22; 713/1; 713/310

(58) Field of Classification Search ............ 713/2
See application file for complete search history.

(56) References Cited

U.S. PATENT DOCUMENTS

| | | | |
|---|---|---|---|
| 5,859,987 A * | 1/1999 | Gillespie et al. ......... 710/311 |
| 5,898,869 A * | 4/1999 | Anderson ................. 713/2 |
| 5,925,099 A * | 7/1999 | Futral et al. ............. 709/204 |
| 6,122,746 A * | 9/2000 | Nouri et al. ............. 713/310 |
| 6,216,224 B1 * | 4/2001 | Klein .................... 713/1 |
| 6,292,409 B1 * | 9/2001 | Smith ................... 365/189.11 |
| 6,611,882 B1 * | 8/2003 | Schmisseur ............. 710/22 |

OTHER PUBLICATIONS

Intel 80303 I/O Processor Developer's Manual, Jun. 2000, Intel Corporation, Chapters 1, 11 and 15.

* cited by examiner

*Primary Examiner*—Thuan N. Du
*Assistant Examiner*—Fahmida Rahman
(74) *Attorney, Agent, or Firm*—Grossman, Tucker, Perreault & Pfleger, PLLC

(57) ABSTRACT

A system and method of initializing a core processing circuit are disclosed. The core processing circuit is held in a reset state while a reset vector is loaded to one or more registers at a boot address associated with the core processing circuit. The reset vector is loaded from a system memory through a host bridge. The reset vector comprises one or more instructions to initialize the core processing system upon release from a reset state.

10 Claims, 2 Drawing Sheets

SYSTEM AND METHOD OF REMOTELY INITIALIZING A LOCAL PROCESSOR

BACKGROUND

1. Field

The subject matter disclosed herein relates to processing systems. In particular, the subject matter disclosed herein relates to initializing a processing system on a core processing circuit from instructions fetched from a memory.

2. Information

A processing system may be initialized on a processor or core processing circuit through a procedure commencing in response to powering up the processor. Upon being powered up, the processor may enter a reset state. Upon release from the reset state, the processor may commence a boot procedure to initialize a processing system. Such a boot procedure typically includes, for example, executing a power-on self test (POST) procedure, allocating processing resources to enable communication with input/output (I/O) devices and launching an operating system. A boot procedure is typically controlled by machine readable instructions which are stored in a local memory array. In response to being released from a reset state, a processor or core processing circuit may commence fetching and executing instructions from a predetermined address in the local memory array to execute the boot procedure.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
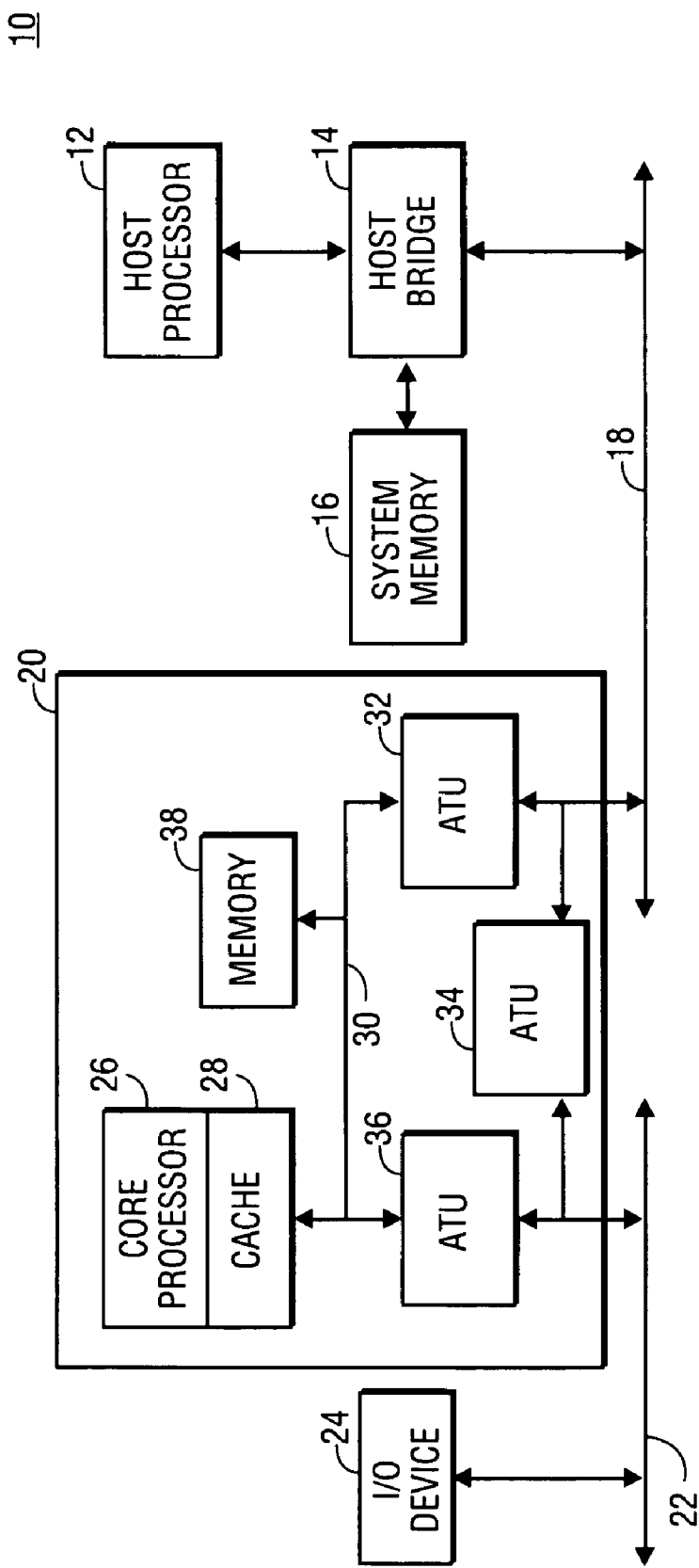
FIG. 1 shows a schematic diagram of a processing platform according to an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions. Such storage devices may comprise optical, magnetic or semiconductor storage media. However, this is merely an example of a storage medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a storage medium in combination with processing circuitry to execute the machine-executable instructions. However, these are merely examples of structures which may provide logic and embodiments of the present invention are not limited in these respects.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device" or "peripheral controller." For example, a peripheral controller may provide inputs to or receive outputs from an application process hosted on the host processing system. However, these are merely examples of a processing system, host processing system and peripheral controller, and embodiments of the present invention are not limited in these respects.

A "data bus" as referred to herein relates to circuitry for transmitting data between devices. For example, a data bus may transmit data between a host processing system and a peripheral controller. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

A "bridge" as referred to herein relates to a device coupled between data busses to transmit data between a device coupled to one data bus and device coupled to another data bus. However, this is merely an example of a bridge and embodiments of the present invention are not limited in this respect.

An "address translation unit" as referred to herein relates to logic to translate addresses of bus transactions addressed according to a first environment to addresses of bus transactions to be addressed according to a second environment. For example, an address translation unit may comprise logic to translate addresses of bus transactions on an internal bus of a peripheral controller to addresses of bus transactions to be transmitted on a data bus external to the peripheral controller. Similarly, an address translation unit may comprise logic to translate addresses of bus transactions on a data bus external to a peripheral controller to addresses of data bus transactions on a data bus internal to the peripheral controller. However, these are merely examples of an address translation unit and embodiments of the present invention are not limited in this respect.

A "memory array" as referred to herein relates to one or more devices in which data may be stored in or retrieved from physically addressable memory locations. Such physically addressable locations may comprise consecutively addressable data words having the capacity to store a uniform number of data bits. A memory array may be formed in any one of several mediums such as, for example, semiconductor, optical or magnetic media. However, these are merely examples of a memory array and embodiments of the present invention are not limited in these respects.

A "core processing circuit" as referred to herein relates to logic formed in a device which is capable of executing logical instructions. A core processing circuit may execute logical instructions defining data as inputs to the instructions. In one example of a core processing circuit, the core processing circuit may execute logical instructions stored in a memory array. In another example, a core processing circuit may comprise more than one synchronized processing elements which execute logical instructions stored in a common memory array or distinct memory arrays. However, these are merely examples of a core processing circuit and embodiments of the present invention are not limited in these respects.

A "reset state" as referred to herein relates to a state of a core processing circuit in which the execution of instructions is suspended. Upon "release" from a reset state, a core processing circuit may commence executing instructions fetched from a predetermined location in a storage medium to initialize the core processing circuit for runtime processing. Also, a release from a reset state may result in an initialization of an internal state or sequential elements of a core processing circuit to a known state. However, these are merely examples of a reset state and a release from a reset state, and embodiments of the present invention are not limited in these respects.

A "reset vector" as referred to herein relates to one or more instructions to be fetched and executed by a core processing circuit upon release of the core processing circuit from a reset state. For example, a reset vector may be stored at a predetermined location in a storage medium to be fetched by a core processing circuit upon release of the core processing circuit from a reset state. However, this is merely an example of a reset vector and embodiments of the present invention are not limited in this respect.

A processing system may store data in or retrieve data from a "system memory" comprising a memory array coupled to a processing circuit through a data bus. A core processing circuit may also store data in or retrieve data from a "cache memory array" which may provide faster storage or retrieval of data than storage or retrieval of data in a system memory. For example, logic at the core processing circuit may access the cache memory independently of a data bus which may reduce any latency associated with the storage or retrieval of data. However, these are merely examples of a system memory and a cache memory array, and embodiments of the present invention are not limited in these respects.

A "host bridge" as referred to herein relates to a bridge coupled between a host processing system and one or more peripheral controllers or devices. A host bridge may couple a host processor of a host processing system to one or more peripheral devices. A host bridge may also be coupled to a system memory of a host processing system to control access to the system memory in response to read or write requests. However, these are merely examples of a host bridge and embodiments of the present invention are not limited in these respects.

Briefly, an embodiment of the present invention relates to a system and method of initializing a core processing circuit. The core processing circuit may be held in a reset state during which one or more instructions are loaded to one or more registers at a boot address from a host processing system through a host bridge. The instructions may comprise one or more instructions to initialize the core processing circuit upon release from the reset state. However, this is merely an example embodiment and other embodiments of the present invention are not limited in this respect.

FIG. 1 shows a schematic diagram of a processing platform 10 according to an embodiment. A host processor 12, system memory 16 and host bridge 14 provide a host processing system. The host bridge 14 is coupled to a peripheral controller 20 through a data bus 18. The peripheral controller 20 may also be coupled to an input/output (I/O) device 24 through a data bus 22. The data busses 18 and 22 may comprise peripheral component interconnect (PCI) data bus structures formed according to the PCI Local Bus Specification, Rev. 2.2, Dec. 18, 1998, PCI Special Interest Group (hereinafter the "PCI Local Bus Specification"). However, this is merely an example of a processing platform and embodiments of the present invention are not limited in this respect.

The system memory 16 may comprise any one of several storage devices providing random access memory (RAM) such as dynamic RAM, synchronous dynamic RAM or the like. The host processor 12 may comprise any one of several processing circuits capable of executing instructions fetched from the system memory 16 such as versions of the Pentium® or Itanium® processor sold by Intel Corporation. In response to a reset event, an operating system may be launched on the host processor 12 and system memory 16 to provide a host processing system. However, this is merely an example of a host processing system and embodiments of the present invention are not limited in this respect.

The host bridge 14 may comprise logic to control access to the system memory 16 in response to read or write requests received from either the host processor 12 or the data bus 18. For example, the host bridge 14 may respond to commands to read data from or write data to addressable locations in the system memory 16. Similarly, the host bridge 14 may respond to a read or write bus transaction from the data bus 18 to read data from or write data to addressable locations in the system memory 16 as indicated in the bus transaction. The host bridge 14 may comprise a memory controller hub (MCH) such as the 82850 MCH sold by Intel Corporation. However, these are merely examples of a host bridge and embodiments of the present invention are not limited in these respects.

In an alternative embodiment, the data bus 18 may be coupled to the host bridge 14 through an input/output (I/O) bridge (not shown) to forward bus transactions between the peripheral controller 20 and the host bridge 14. Such an I/O bridge may comprise a 82806AA PCI 64 Hub sold by Intel Corporation. However, this is merely an example of how a peripheral controller may be coupled to a host bridge and embodiments of the present invention are not limited in this respect.

The data bus 18 may transmit bus transactions between the peripheral controller 20 and the host bridge according to a bus protocol. For example, the peripheral controller 20 may initiate a read bus transaction on the data bus 18 to access data stored in the system memory 16. Also, the host processor 12 may execute one or more processes to initiate a write bus transaction on the data bus 18 addressed to a location in the peripheral controller 20. Such a bus transaction protocol may be provided in the PCI Local Bus Specification. However, this is merely an example bus transaction protocol and embodiments of the present invention are not limited in this respect.

Peripheral controller 20 comprises an internal data bus 30 coupled to a core processing circuit 26 and address translation units (ATUs) 32 and 36. The internal data bus 30 may be formed according to the PCI Local Bus Specification. The peripheral controller 20 may also comprise a local memory 38 which is accessible through the internal data bus 30. The memory 38 may store one or more control registers which may be accessed through read and write bus transactions on the internal data bus 30. However, this is merely an example of a peripheral controller and embodiments of the present invention are not limited in this respect.

The core processing circuit 26 comprises a cache memory array 28 and logic to fetch and execute machine-readable instructions from the cache memory array 28, memory 38 or other memory devices. For example, the core processing circuit 26 may comprise a reduced instruction set computer (RISC) core such as the XScale® or i960® processors sold by Intel Corporation. However, these are merely examples of a core processing circuit and embodiments of the present invention are not limited in these respects.

The ATU 32 may comprise logic to transmit "inbound transactions" from the data bus 18 to devices coupled to the internal data bus 30, and transmit "outbound transactions" from the internal data bus 30 to the host bridge 14. In response to an inbound transaction initiated by the host bridge 14, the ATU 32 may convert a bus address (e.g., a PCI address) to an internal data bus address, and initiate a subsequent bus transaction on the internal data bus 30 according to the converted internal data bus address. In response to an outbound transaction, the ATU 32 may convert an internal data bus address (associated with the transaction) to a data bus address on the data bus 18 and forward the outbound transaction to a destination on the data bus 18 according to the converted data bus address. For example, the ATU 32 may comprise a primary ATU as formed in the 80303 I/O Processor sold by Intel® Corporation. However, these are merely examples of an ATU and embodiments of the present invention are not limited in these respects.

Figure 2:
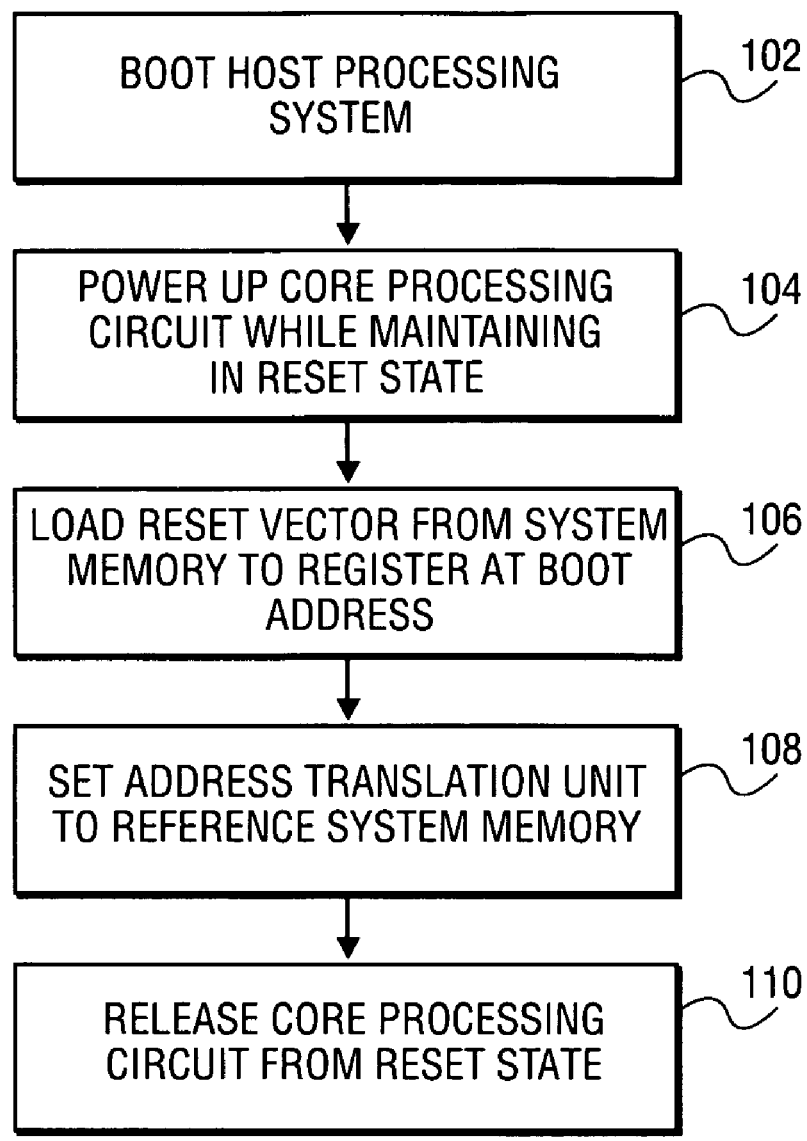
FIG. 2 shows a flow diagram illustrating a mechanism to initialize a core processing circuit according to an embodiment of the processing platform shown in FIG. 1.

FIG. 2 shows a flow diagram illustrating a mechanism to initialize a core processing circuit according to an embodiment of the processing platform shown in FIG. 1. At block 102, the host processor 12 may be powered and booted upon release from a reset state in response to an external event. For example, instructions from a basic input/output system (BIOS) may be loaded to the system memory 16 and executed by the host processor 12 to launch an operating system and initialize a host processing system. However, this is merely an example of how a host processing system may be booted and embodiments of the present invention are not limited in this respect.

Blocks 104 through 10 illustrate actions which may be controlled by logic at the host processing system to externally load a reset vector to one or more registers in the peripheral controller 20 at a boot address associated with the core processing circuit 26, and release the core processing circuit 26 from a reset state to boot the core processing circuit 26 from the externally loaded reset vector. For example, the host processing system may execute the actions at blocks 104 through 110 under the control of machine-readable instructions loaded to the system memory 16. However, this is merely an example of logic at a host processing system to externally load a reset vector at a boot address of a core processing circuit and embodiments of the present invention are not limited in this respect.

At block 104, the host processing system may cause the core processing circuit 26 to be powered up while maintaining the core processing circuit 26 in a reset state. For example, the host processing system may initiate one or more write bus transactions on the data bus 18 to control registers defined in the memory 30 which control the power state of the peripheral controller 20. Alternatively, the host processing system may assert signals on one or more pins (not shown) to apply power to the peripheral controller 20. However, these are merely examples of how a power state of a peripheral controller may be controlled and embodiments of the present invention are not limited in this respect.

Once the peripheral controller 20 is powered, the host processing system may maintain the core processing circuit 26 in a reset state by, for example, initiating one or more write bus transactions on the data bus 18 to control registers which control the reset state of the core processing circuit 26. Alternatively, the host processing system may assert signals on one or more pins (not shown) of the peripheral controller 20 to maintain the core processing circuit in a reset state. However, these are merely examples of how a core processing circuit may be controlled to be held in a reset state and embodiments of the present invention are not limited in these respects.

The core processing circuit 26 may comprise logic to fetch and commence executing instructions from a register in a memory location at a boot address in response to being released from the reset state. In one embodiment, a bit in the memory 38 may determine that the boot address is to locate a register at a base memory address (e.g., address location 0×0h) in the memory 38. Alternatively, the bit may determine that the boot address is to locate a register in the cache memory array 28. The core processing circuit 26 may comprise logic to fetch and commence executing instructions located at the boot address (e.g., located in the memory 38 or cache memory array 28) from an initial register of a cache memory array 28. At block 106, the host processing system may initiate a write bus transaction on the data bus 18 to load a reset vector to the boot address associated with the core processing circuit 26 while the core processing circuit is maintained in the reset state. For example, the host processing system may initiate one or more write bus transactions on the data bus 18 which are addressed to one or more registers in the cache memory array 28 or memory 30 beginning at a boot address. However, this is merely an example of how a reset vector may be externally loaded to a boot address of a core processing circuit and embodiments of the present invention are not limited in this respect.

According to an embodiment, at block 106 the host processing system may initiate a bus transaction to write to one or more bits in a control register of the memory 38 to define a memory location indicated by the boot address (e.g., a register in either the memory 38 or the cache memory array 28). However, this is merely an example of how a host processing system may define a location for a boot address and embodiments of the present invention is not limited in this respect.

According to an embodiment, the externally loaded reset vector may comprise an instruction to branch to a memory location on the system memory 16 to commence fetching and executing instructions stored in the system memory 16. Such instructions fetched from the system memory 16 may include, for example, instructions to execute a power-on self test (POST) procedure, allocate processing resources to communicate with input/output devices and launch an operating system and/or run-time application programs. However, this is merely an example of instructions which may be fetched from a system memory through host bridge and executed by a core processing circuit in response to a reset event, and embodiments of the present invention are not limited in this respect.

In an embodiment in which the core processing circuit 26 comprises an XScale® processing core, for example, a reset vector may comprise a 32-bit instruction loaded to a boot address in the cache memory array 28 which provides a short branch to a second, 64-bit instruction in the cache memory array 28. The 64-bit instruction may then provide a long branch to access additional instructions in the system memory 16 through the ATU 32 for execution to initialize the core processing circuit 26. However, this merely illustrates an example of a reset vector which may be loaded to a boot address and embodiments of the present invention are not limited in this respect.

At block 108, the host processing system may set the ATU 32 to enable outbound transactions to address particular locations in the system memory 16. The host processing system may initiate write bus transactions on the data bus 18 to set one or more registers at the ATU 32 (which are accessible by the data bus 18) to accurately reference outbound transactions to intended locations in the system memory 16. In an embodiment in which the ATU 32 comprises an ATU as formed in the Intel® 80303 I/O processor, for example, such write bus transactions may load registers as described in the Intel® 80303 I/O Processor Developer's Manual, June 2000, Chapter 15, Intel Corporation. However, this is merely an example of how a host processing system may set an ATU to reference data in an external memory environment and embodiments of the present invention are not limited in this respect.

At block 110, the core processing circuit 26 may be released from the reset state (maintained or held at block 104) to enable the core processing circuit 26 to commence fetching and executing instructions from the reset vector at the boot address. The host processing system may release the core processing circuit 26 from the reset state by, for example, initiating one or more write bus transactions on the data bus 18 to control registers which control the reset state of the core processing circuit 26. Alternatively, the host processing system may assert or de-assert signals on one or more pins (not shown) of the peripheral controller 20 to release the core processing circuit from the reset state. However, this is merely an example of how a core processing circuit may be released from a reset state and embodiments of the present invention are not limited in this respect.

In an alternative embodiment, the host processing system may load all instructions to initialize the core processing circuit 26 (e.g., instructions for executing the POST procedure, allocating resources to communicate with I/O devices and launching an operating system and/or runtime application programs) while the core processing circuit 26 is maintained in a reset state. Here, the cache memory array 28 may be of sufficient size to store all instructions to initialize the core processing circuit 26 such that the core processing circuit need not fetch and execute additional instructions from the system memory 16 to complete the initialization. Accordingly, upon release from a reset state the core processing circuit 26 may fetch and execute all instructions to complete initialization from the instructions in the cache memory array 28 loaded by the host processing system.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a peripheral controller comprising a core processing circuit, an internal data bus coupled to the core processing circuit, registers formed in one of a cache memory array associated with the core processing circuit and a memory coupled to the core processing circuit through the internal data bus, and at least one address translation unit coupled to the internal data bus; and
   a host processing system coupled to the core processing circuit through an external data bus, the host processing system comprising:
   a host bridge coupled to the external data bus;
   logic to maintain the core processing circuit in a reset state during power up of the core processing circuit;
   logic to initiate one or more write bus transactions at the address translation unit to load a reset vector to one or more of the registers at a boot address associated with the core processing circuit while the core processing circuit is in the reset state, the reset vector comprising one or more instructions to fetch additional instructions to initialize the core processing circuit upon release from the reset state;
   a system memory coupled to the host bridge;
   logic to set the address translation unit to enable at least one outbound transaction to address at least one location in the system memory to fetch instructions from the system memory in response to requests from the core processing circuit, wherein the reset vector comprises at least one instruction to fetch data from the system memory via the host bridge, the address translation unit being configured to convert an internal data bus address associated with the outbound transaction to an external data bus address and configured to forward the outbound transaction from the internal data bus coupled to the core processing circuit to the external data bus coupled to the system memory via the host bridge; and
   logic to initiate one or more read bus transactions at the address translation unit addressed to the system memory in response to execution of the reset vector upon release from the reset state.

2. The system of claim 1, wherein the host processing system further comprises logic to release the core processing circuit from the reset state in response to loading the reset vector at the boot address.

3. The system of claim 1, wherein the additional instructions comprise instructions to commence a power-on self test procedure.

4. The system of claim 3, wherein the additional instructions further comprise instructions to launch an operating system to the core processing circuit.

5. A method comprising:
   having a host processing system maintain a core processing circuit in a reset state during power up of the core processing circuit;
   initiating one or more write bus transactions at an address translation unit to load a reset vector to one or more registers at a boot address associated with the core processing circuit while the core processing circuit is in the reset state, wherein the reset vector is loaded to the boot address in registers formed in one of a cache memory associated with the core processing circuit and a memory coupled to the core processing circuit through a data bus, the reset vector comprising one or more instructions to fetch additional instructions from a system memory coupled to the core processing circuit through a host bridge of the host processing system;

setting the address translation unit to enable at least one outbound transaction to address at least one location in the system memory to fetch instructions from the system memory in response to requests from the core processing circuit;

initiating one or more read bus transactions at the address translation unit addressed to the system memory in response to execution of the reset vector upon release of the core processing circuit from the reset state; and in response to an outbound transaction, converting an internal bus address associated with the outbound transaction to an external data bus address and forwarding the outbound transaction from an internal data bus coupled to the core processing circuit to an external data bus coupled to the system memory.

6. The method of claim 5, wherein the additional instructions further comprise instructions to commence a power-on self test procedure.

7. The method of claim 6, wherein the additional instructions further comprise instructions to launch an operating system to the core processing circuit.

8. An article comprising:

a storage medium comprising machine-readable instructions encoded there on for:

having a host processing system maintain a core processing circuit in a reset state during power up of the core processing circuit;

initiating one or more write bus transactions at an address translation unit to load a reset vector to one or more registers at a boot address associated with the core processing circuit while the core processing circuit is in the reset state, wherein the instructions are loaded to the boot address in registers formed in one of a cache memory associated with the core processing circuit and a memory coupled to the core processing circuit through a data bus, the reset vector comprising one or more instructions to fetch additional instructions from a system memory coupled to the core processing circuit through a host bridge of the host processing system;

releasing the core processing circuit from the reset state in response to loading the reset vector at the boot address; and setting the address translation unit to enable at least one outbound transaction to address at least one location in the system memory to fetch instructions from the system memory in response to requests from the core processing circuit, the address translation unit being configured to convert an internal data bus address associated with the outbound transaction to an external data bus address and configured to forward the outbound transaction from an internal data bus coupled to the core processing circuit to an external data bus coupled to the system memory.

9. The article of claim 8, wherein the additional instructions comprise instructions to commence a power-on self test procedure.

10. The article of claim 9, wherein the additional instructions further comprise instructions to launch an operating system to the core processing circuit.

* * * * *

UNITED STATES PATENT AND TRADEMARK OFFICE
CERTIFICATE OF CORRECTION

PATENT NO. : 7,290,127 B2 Page 1 of 1
APPLICATION NO. : 10/032762
DATED : October 30, 2007
INVENTOR(S) : Schmisseur et al.

It is certified that error appears in the above-identified patent and that said Letters Patent is hereby corrected as shown below:

On the Title page, item (75), in "Inventors", in column 1, line 4, delete "Delf" and insert -- Deif --, therefor.

Signed and Sealed this

Fifth Day of August, 2008

JON W. DUDAS
*Director of the United States Patent and Trademark Office*